Figure 1:
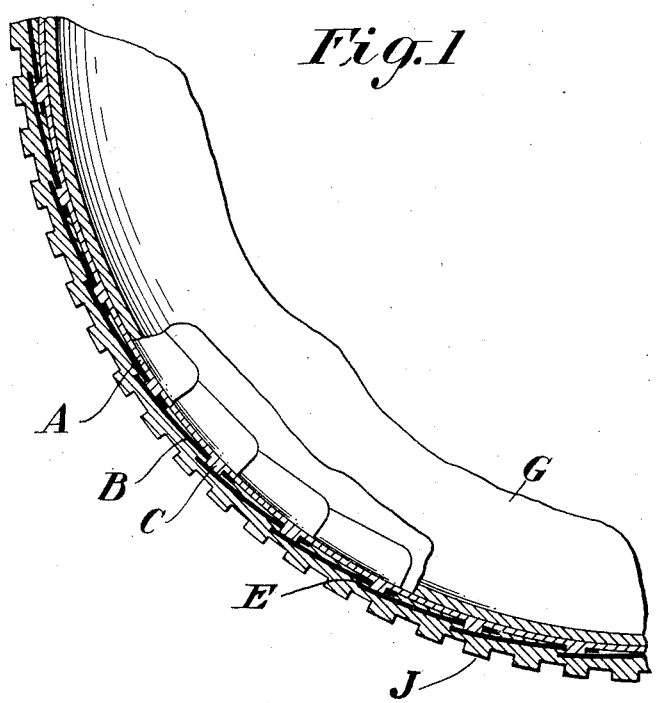
Figure 2:
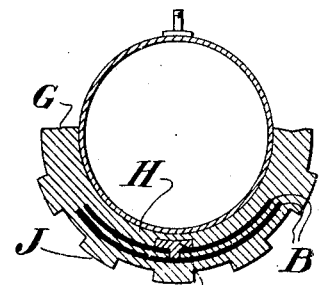
Figure 4:
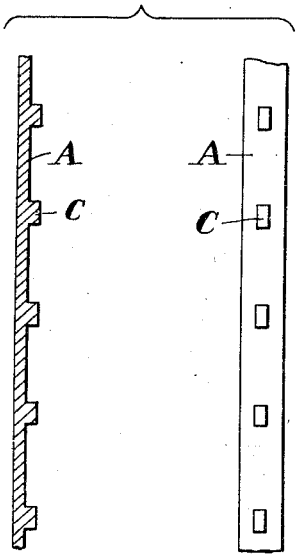
Figure 3:
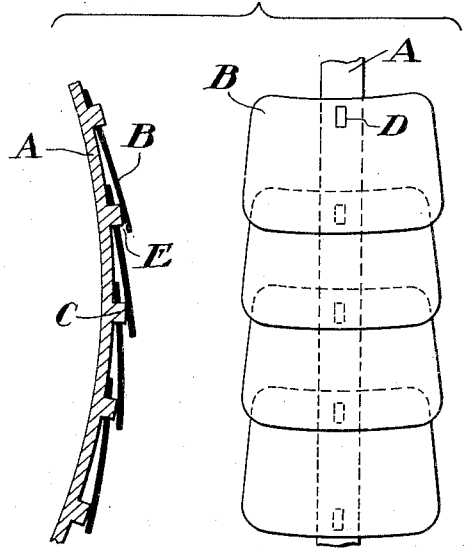

Inventor.
John Carey

Patented Aug. 22, 1933

1,923,661

UNITED STATES PATENT OFFICE 1,923,661

PUNCTUREPROOF TIRE

John Carey, New York, N. Y.

Application December 10, 1931
Serial No. 580,209

7 Claims. (Cl. 152—18)

An object of the invention is to provide a puncture proof pneumatic tire casing.

A further object of the invention is to provide in the service section, above the tread, of the tire casing a succession of similar punctureproof plates of metal set buoyantly to preserve the resiliency the expansion and contraction and avoid friction in the tire thereby forming a core or heart of the tire casing, that is to incorporate in the service section of the tire casing overlapping metal plates formed to the curvatures of the said part of tire casing and to provide means of holding such plates in proper relative relation, comprising a rubber band or belt provided with oblong upstanding integral equally spaced projections adapted to engage through corresponding openings in the metal plates each projection also acting as a support for an overlapping plate each opening in a position to be protected by an overlapping plate and oblong shaped to keep plate in alignment.

The following description of my invention taken in connection with the accompanying drawing in which:

Fig.—1— is a section of side elevation of a pneumatic tire including my invention.

Fig.—2— is a cross section of same.

Fig.—3— is plan view showing a section of the circular rubber guide belt united with metal plates.

Fig.—4— is side elevation of a section of the circular guide and expansion belt straightened out showing its solid one piece formation.

—A— denotes the rubber guide belt.

—B— denotes the metal plates.

—C— denotes the oblong projections.

—D— denotes the oblong hole in plates.

—E— denotes the space between the plates which is much greater than the thickness of the plates.

—G— denotes the tire casing.

—H— denotes that section of the tire casing between the inner tube and the expansion belt.

—J— indicates the tire tread.

What is meant by service section of the tire casing is that portion of the tire casing above the tread the section in which plates set forming a core.

Referring to the drawing in detail wherein like reference characters denote corresponding parts.

G indicates a pneumatic tire casing having incorporated in its service section the metallic plates B. Prior to incorporating the plates in the tire casing the plates B are assembled with the rubber belt A which has formed on its outer surface oblong equally spaced projections C formed on the plates B on the center line near one edge thereof are corresponding oblong openings D. The projections C are passed through openings D near the edge of the plates are engaged and extend through a sufficient distance to support an adjacent plate near the edge opposite the said opening so that the plates are held in alignment and spaced from each other a distance much greater than the thickness of the plates and the oblong opening in underlying plate is protected by the overlapping end of adjacent plate.

A novel feature of having the oblong opening formed on the center line near underlying end of plate is to be in a position to be protected from puncture by the overlapping end of adjacent plate.

A novel feature of having the oblong shape to the projection and opening is to keep each plate in alignment by securing at one point only thus eliminating the detrimental effects to the rubber casing which would occur if each plate was fastened at more than one point.

Other novel features of the individual oblong hole or opening being formed on the center line near one edge of each plate is for the purpose that the oblong rubber projection can be passed through the plate, be secured to the plate and extend to provide a support for the overlying end of succeeding plate and thus eliminate supports or braces of metal or material foreign to rubber to keep plates spaced for a sufficient cushion of rubber between them.

It will be seen that by the use of the belt and plates constructed as noted above the service section of the tire casing is armored against puncture by tacks, nails or other sharp penetrating objects and that the construction is such that the plates are held relatively thereby preventing excessive heating or other detrimental effects which would occur if the plates were fastened at more than one point or were in contact with each other.

And it is to be understood that in the process of manufacture of the tire casing rubber flows through and fills the spaces E between the plates. The anchoring of the plates is effected by the oblong equally spaced rubber projections on belt thus avoiding additional fastening means to secure the plates in proper position and alignment. It is seen that the fastening or anchoring is accomplished at only one point in each plate.

In the final fusing of the tire casing it is immaterial whether the rubber belt loses its identity or not the plates are anchored relatively and buoyantly as a core or heart of the service section of the tire casing.

Having described my invention what I claim as new is the following:

1. A pneumatic tire having a puncture proof armor consisting of a rubber guide belt having oblong equally spaced integral projections on the outer surface thereof, a succession of similar metal plates shaped to the curvatures of the service section of the tire casing, each plate having on the center line near one edge an oblong hole or opening corresponding in shape to said projection and adapted to be engaged therewith each plate overlying an adjacent plate and resting on the extended end of an adjacent projection.

2. A pneumatic tire having incorporated in the service section of the tire casing a combination equally spaced oblong shaped aligning anchoring and separating brace of rubber consisting of a rubber guide belt having oblong equally spaced integral projections on its outer surface.

3. A pneumatic tire having a sectional core of similar overlying puncture proof plates incorporated in the service section of the tire casing each individual plate having but one oblong hole or opening and formed on the center line of the tire near the underlying end thereof.

4. A pneumatic tire having incorporated in the tire casing a sectional core of puncture proof similar overlying plates each plate buoyantly and relatively secured by only one anchoring post consisting of an integral rubber projection passing through an opening in the underlying plate and extending to an adjacent end of overlapping plate.

5. A pneumatic tire having combination aligning and individual fastening and separating posts incorporated in the service section of the tire casing above the tread consisting of a succession of equally spaced integral oblong projections extending outwardly on the center line of the tire.

6. A pneumatic tire casing having a sectional core of similar overlapping puncture proof plates each plate shaped to the curvature of the tread of the tire casing and each plate having but one individual oblong opening formed in it and so placed, near the underlying end on the center line, to be in position that the anchorage secured through it is protected by the overlapping end of an adjacent plate.

7. The incorporation in the casing of a pneumatic tire of puncture proof armor consisting of a rubber guide belt having formed on its outer surface integral equally spaced oblong projections united with a succession of similar overlying puncture proof plates shaped to the curvature of the service section of a tire casing and each plate having formed on the center line near one edge an oblong opening corresponding to the said projection and adapted to be engaged therewith.

JOHN CAREY.